US009777483B2

(12) United States Patent
Secco et al.

(10) Patent No.: US 9,777,483 B2
(45) Date of Patent: Oct. 3, 2017

(54) SUNSHADE COMPRISING A FIXED PART AND A MOTORIZED MOVING PART, BOTH PARTS BEING EQUIPPED WITH PHOTOVOLTAIC CELLS

(71) Applicants: SVH ENERGIE, Saint-Ouen (FR); SIKA S.R.L., Treviso (IT)

(72) Inventors: Pietro Secco, Dosson di Casier (IT); Gilles Ylan Sabban, Neuilly sur Seine (FR)

(73) Assignees: SVH ENERGIE, Saint Ouen (FR); SIKA S.R.L., Paris (FR)

( * ) Notice: Subject to any disclaimer, the term of this patent is extended or adjusted under 35 U.S.C. 154(b) by 0 days.

(21) Appl. No.: 15/134,628

(22) Filed: Apr. 21, 2016

(65) Prior Publication Data
US 2016/0230394 A1  Aug. 11, 2016

Related U.S. Application Data

(63) Continuation of application No. PCT/FR2014/052708, filed on Oct. 23, 2014.

(30) Foreign Application Priority Data

Oct. 25, 2013  (FR) ...................................... 13 60429

(51) Int. Cl.
*E04F 10/10* (2006.01)
*H02S 20/22* (2014.01)
(Continued)

(52) U.S. Cl.
CPC ................ *E04F 10/10* (2013.01); *E06B 9/24* (2013.01); *H02S 20/22* (2014.12); *H02S 20/30* (2014.12);
(Continued)

(58) Field of Classification Search
CPC .... E04F 10/10; E06B 9/24; E06B 2009/2476; H02S 20/22; H02S 20/30; Y02B 10/10
(Continued)

(56) References Cited

U.S. PATENT DOCUMENTS 1,796,564 A * 3/1931 Firguson ................. E04F 10/10
160/34
2,581,827 A * 1/1952 Zveibil ................... E04F 10/10
160/62
(Continued)

FOREIGN PATENT DOCUMENTS

CA       2188992 A1 * 4/1998 ............... F21S 8/033
CH  DE 102006001332    * 7/2007 .......... E04F 10/0666
(Continued)

OTHER PUBLICATIONS

EP0239141_Machine_Translate, retrived on Sep. 15, 2016.*
(Continued)

*Primary Examiner* — Babajide Demuren
(74) *Attorney, Agent, or Firm* — Burris Law, PLLC

(57) ABSTRACT

A sunshade is provided that is intended to be attached to a building by supports arranged along an inner side, so as to protect the building from solar radiation. The sunshade includes a fixed part equipped with supports, and a moving part guided by guide members that allow the sunshade to be moved toward the fixed part in order to obtain an overlapping of these parts under the effect of a motorizing system, these two fixed and moving parts accepting photovoltaic cells.

13 Claims, 2 Drawing Sheets

(51) Int. Cl.
*H02S 20/30* (2014.01)
*H02S 40/10* (2014.01)
*E06B 9/24* (2006.01)

(52) U.S. Cl.
CPC ...... *H02S 40/10* (2014.12); *E06B 2009/2476* (2013.01); *Y02B 10/10* (2013.01)

(58) Field of Classification Search
USPC .................. 52/74–78, 73, 64, 66, 67, 68, 72
See application file for complete search history.

(56) References Cited

U.S. PATENT DOCUMENTS

| | | | | |
|---|---|---|---|---|
| 2,967,567 | A * | 1/1961 | Heckerman | E04F 10/10 160/172 R |
| 4,616,451 | A * | 10/1986 | Glick | E04B 7/166 49/125 |
| 5,778,603 | A * | 7/1998 | Reppas | E04B 7/166 52/6 |
| 6,138,417 | A * | 10/2000 | Woodard | E04B 7/166 160/202 |
| 8,347,935 | B2 * | 1/2013 | Svirsky | E04F 10/10 160/352 |
| 2001/0027846 | A1 * | 10/2001 | Osinga | E04F 10/0659 160/70 |
| 2003/0213185 | A1 * | 11/2003 | Findley | B60G 3/00 52/67 |
| 2009/0013614 | A1 * | 1/2009 | Rogers | B60P 3/34 52/66 |
| 2009/0032100 | A1 * | 2/2009 | Oak | E04F 10/005 136/259 |
| 2012/0193036 | A1 * | 8/2012 | Lamotte | E04F 10/005 160/22 |
| 2013/0192770 | A1 | 8/2013 | Murphy, Jr. | |

FOREIGN PATENT DOCUMENTS

| | | | | |
|---|---|---|---|---|
| EP | 0298528 | | 1/1989 | |
| FR | EP 0239141 B1 * | | 5/1991 | ........... A01G 9/1469 |
| FR | CA 2863805 A1 * | | 8/2013 | .............. E04F 10/10 |
| JP | S5288419 | | 7/1977 | |
| JP | S6019644 | | 2/1985 | |
| JP | S6194124 | | 6/1986 | |
| KR | 101256836 | | 4/2013 | |
| WO | 2013008043 | | 1/2013 | |

OTHER PUBLICATIONS

International Search Report for International Application PCT/FR2014/0527008, mailed Mar. 5, 2015.

* cited by examiner

SUNSHADE COMPRISING A FIXED PART AND A MOTORIZED MOVING PART, BOTH PARTS BEING EQUIPPED WITH PHOTOVOLTAIC CELLS

CROSS-REFERENCE TO RELATED APPLICATIONS

This application is a continuation of International Application No. PCT/FR2014/052708, filed on Oct. 23, 2014, which claims the benefit of FR 13/60429 filed on Oct. 25, 2013. The disclosures of the above applications are incorporated herein by reference.

FIELD

The present disclosure relates to a sunshade provided to protect objects from the sun.

BACKGROUND

The statements in this section merely provide background information related to the present disclosure and may not constitute prior art.

It is known to have on the facades of buildings or shelters exposed to the sun, panels forming sunshades which limit or obscure the solar radiation. It is in particular possible to have this type of panel in front of glazed openings of the building, in order to reduce solar radiation in the exposed rooms which may bring a very strong light causing a glare, as well as a rise in temperature by a greenhouse effect through glazing.

This sunshade type may include fixed panels, or movable panels such as blind slats in order to be fitted depending on the intensity and the inclination of the solar radiation, and the requirements of the building.

The sunshade allows controlling the heat input in the buildings, thus reducing the use of air conditioning. It is part of the interesting solutions to promote energy savings by reducing the exploitation costs of a building.

Furthermore, the sunshade may include shapes, an aspect and a color which add a finish and a decoration to the building.

Furthermore, it is known to have, on buildings, photovoltaic panels, in order to use these buildings as supports receiving the cells subjected to the radiation in order to generate an electric power depending on the exposure to the sun.

However, these photovoltaic panels are generally unsightly, and have no other function than this solar energy recovery.

SUMMARY

In one form, the present disclosure provides a sunshade intended to be fastened on a building by supports disposed on an inner side, in order to protect the building from solar radiation, noteworthy in that it includes a fixed portion fitted with supports, and a movable portion guided by guide members allowing displacement towards the fixed portion in order to obtain a covering of these portions under the action of a motorization system, these two portions receiving photovoltaic cells.

An advantage of this sunshade is that with the motorization system, it is possible to adjust its size by deploying or retracting the movable portion depending on the solar radiation and the required protection for the building, while producing an amount of electric energy improved by the sunshade having a surface of photovoltaic cells as large as possible, according to the position of this movable portion.

The sunshade according to the present disclosure may further include one or more of the following features, which may be combined therebetween.

Advantageously, the fixed portion includes crosspieces transversely disposed relative to the inner side, which supports the guide members. A stiff reinforcement bar is thus easily carried out.

Advantageously, in one form, the guide members includes a guide rail which receives rollers, thereby allowing carrying out an accurate guidance with low friction.

In this case, each crosspiece may include at its outer end a support which receives the rollers fitted in the guide rail. The reinforcement bar of the movable portion is thus rigidly fastened to that of the fixed portion.

In particular, each support may include on either side of a vertical plane a set of four rollers, this set of rollers being fitted in one of the two "C" sections of the guide rail. Thus, a stiff guidance is obtained and which may support significant cantilever loads applied to the movable portion.

Advantageously, the sunshade includes an inclination adjustment device disposed between the fixed portion and the supports, which allows improving its inclination depending on the general position of the sun.

In particular, the fixed portion may be linked to each support by a pivot, and by a threaded rod which adjusts the rotation of this fixed portion about this pivot.

Advantageously, the inclination adjustment device allows an adjustment of the slope of the photovoltaic panels relative to the horizontal, which is comprised between about 30 and 40°.

Advantageously, the sunshade includes a brush sweeping the surface of the photovoltaic cells during the movements of the movable portion. A surface of these cells, which remains clean, is thus obtained in a simple and inexpensive manner.

Advantageously, the motorization system includes actuators comprising electric cylinders disposed transversely.

Advantageously, the motorization system includes a control which automatically displaces the movable portion depending on the climatic conditions such as sunlighting or wind. An improvement of the coverage against the radiation and the electric energy production, as well as a protection against severe winds is thus provided.

Advantageously, the motorization system includes a control having an emergency separate power supply allowing independently carrying out the retraction of the movable portion.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
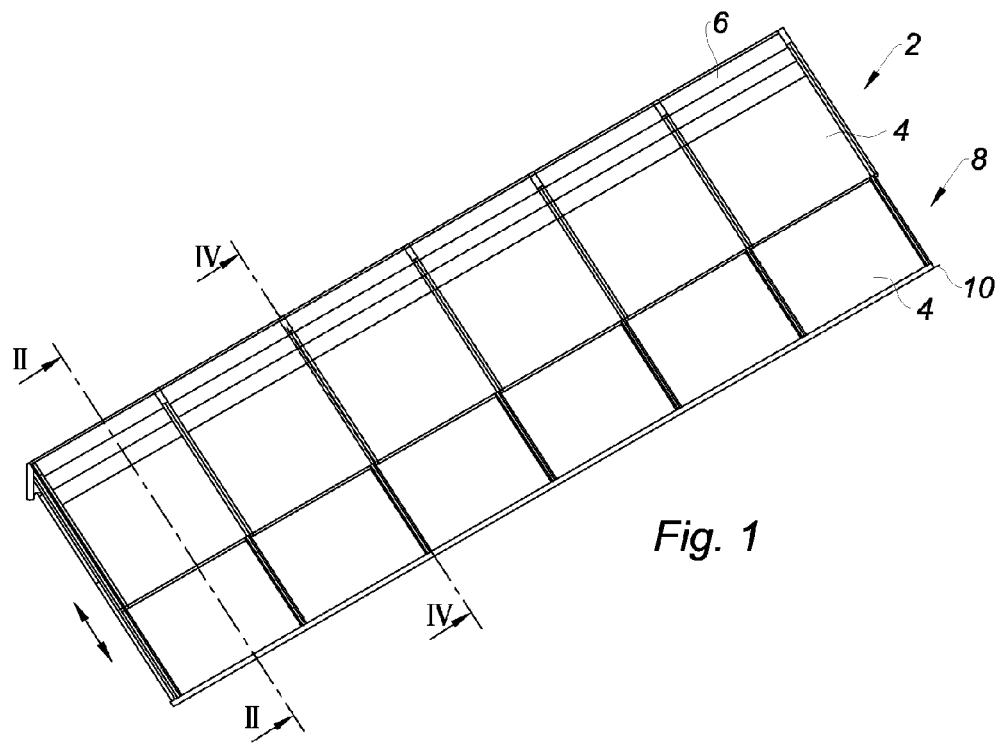
FIG. 1 is an overview of a sunshade according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
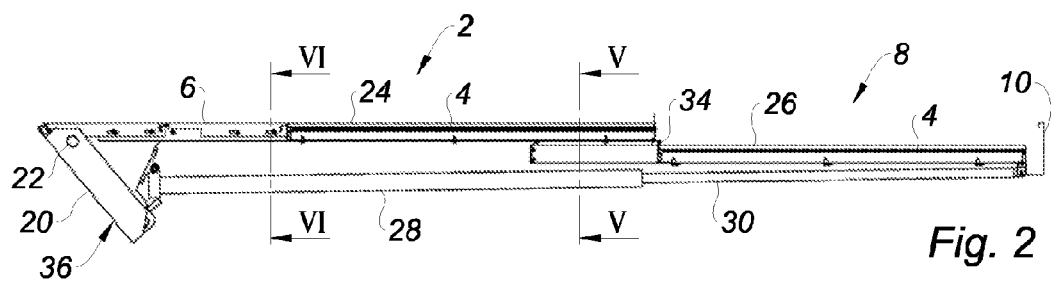
FIG. 2 is a cross-sectional view of a deployed position of the sunshade according to the present disclosure, along the section plane II-II of FIG. 1, which is located between two crosspieces.

FIGS. 1 and 2 show a deployed sunshade forming an elongated rectangle along a longitudinal direction, having a length of about 10 m and a width of about 2.7 m, comprising a length called an inner side length intended to be fastened on a wall or vertical surface of a building, the opposite outer side being downwardly inclined.

The sunshade includes a fixed portion 2 comprising along its length six identical segments each including, along the inner side of a cover panel 6 of reduced width, and a second surface of greater width covered by a photovoltaic panel 4.

The sunshade includes a movable portion 8 comprising along its length six photovoltaic panels 4 which completely cover this movable portion, each disposed in front of an identical panel of the fixed portion 2.

The fixed portion 2 of the sunshade includes a reinforcement bar comprising a succession of crosspieces 24 which are located at each end and at each junction between the segments. Each crosspiece 24 is linked by a screw forming a pivot 22 to a folded sheet metal support 20, comprising a flat base 36 provided to be vertically fastened on the building, and the ridges of each side which stiffens it.

The movable portion 8 of the sunshade includes a reinforcement bar comprising a succession of lined up guide rails 26 on each crosspiece 24, and guided by these crosspieces. A longitudinal gutter 10 is disposed on the outer side of the movable portion 8, in order to receive water in case of rain.

The sunshade includes electrically motorized telescopic cylinders 28, each disposed under a crosspiece 24 and a guide rail 26, which are installed starting from the ends of both photovoltaic panels 4.

Figure 3:
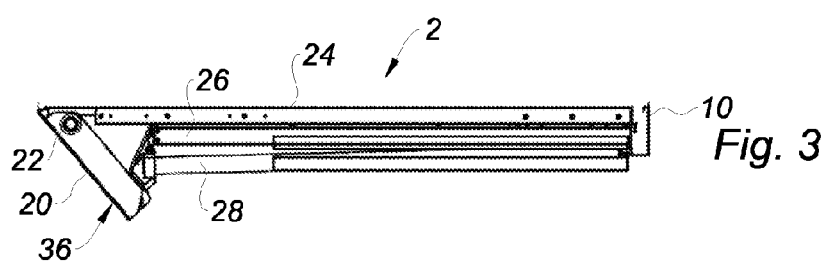
FIG. 3 is a cross-sectional view of the sunshade along the section plane II-II, illustrating a retracted position of the sunshade according to the teachings of the present disclosure.

Each telescopic cylinder 28 including a sliding rod 30, has the end of its body fastened to the support 20, the opposite end of the rod being fastened to the outer side of the guide rail 26. The telescopic cylinders controlled in a synchronized manner, allow a deployment of the movable portion 8, or its retraction by sliding it completely below the fixed portion, as shown in FIG. 3.

The outer side of the fixed portion 2 ends with a junction bar linking the end of the crosspieces 24 therebetween, comprising a brush 34 facing downwards which is supported on the top of the photovoltaic panels 4 of the movable portion 8, in order to ensure a certain sealing as well as a cleaning of these panels during the movement of the movable portion.

Figure 4:
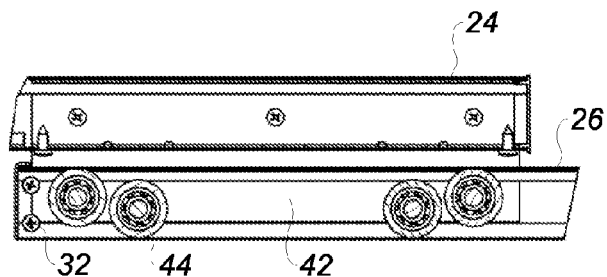
FIG. 4 is a detail view of the guidance of the movable portion, along a sectional plane IV-IV of FIG. 1, passing through a crosspiece.
Figure 5:
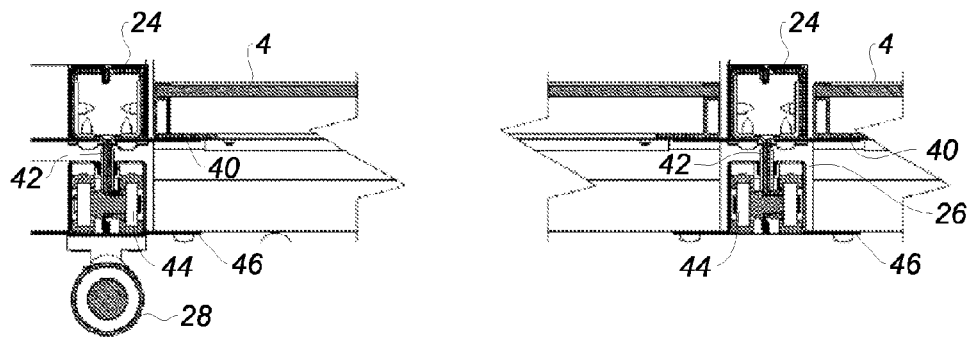
FIG. 5 is a partial longitudinal sectional view of the sunshade, along the sectional plane V-V of FIG. 2, passing through the guidance between the two portions of the transverse support post.

FIGS. 4 and 5 show a crosspiece 24 composed of two folded sheet metal profiles which are assembled, substantially forming a square tube giving stiffness to the reinforcement bar of the fixed portion 2. The crosspieces 24 are equipped on each side by a lower lateral wing 40, these wings supporting a photovoltaic panel 4 disposed on one side for an end crosspiece, or two panels of each side for the other crosspieces.

The outer end of each crosspiece 24 receives a support 42 constituted by a folded metal sheet, comprising in its upper portion a square section fitted in the square tube of this crosspiece and fastened with screws, this support having a lower vertical plane passing through a central groove of the square tube, in order to allow the fastening of a set of four rollers 44 on each face of this plane. The rollers 44 include a nylon ring mounted on a ball bearing.

The guide rail 26 includes two lateral "C" shaped sections having openings facing towards each other, formed by two folded sheet metal profiles which are assembled together. The guide rails 26 are equipped on either side with a lower lateral wing 46, the wings supporting a photovoltaic panel 4 disposed on one side to an end rail, or two panels of each side to the other rails.

The vertical plane of the support 42 being inserted into an upper central slot of the guide rail 26, each set of four rollers 44 is fitted in one of the "C" sections in order to accurately guide it, while resuming forces due to the mass as well as climatological conditions applying to the movable portion 8. For this purpose two rollers 44 fastened to the ends of the support, are supported on the upper guide of the "C" section, and the other two rollers fastened right next to these two first rollers, are supported on the lower guide of this section.

A ridge located at the inner end of the guide rail, is supported on the end of stroke abutments 32 fastened to the support 42 after the last roller 44 toward the inner side, to form a stop of this rail when the movable portion 8 of the sunshade is completely deployed, the cylinders 28 being at the end of stroke.

Thus, an accurate guidance of the guide rail 26, comprising a bearing without friction during the movement of the movable portion 8 of the sunshade, with a maximum spacing from the rollers disposed at the ends of the support 42 allowing holding up forces and opposing the tipping torque generated by this movable portion.

FIG. 5 shows more below the first guide rail 26 of the end of the sunshade, disposed to the left of this figure, the cylinder 28 which is a sectional view.

Figure 6:
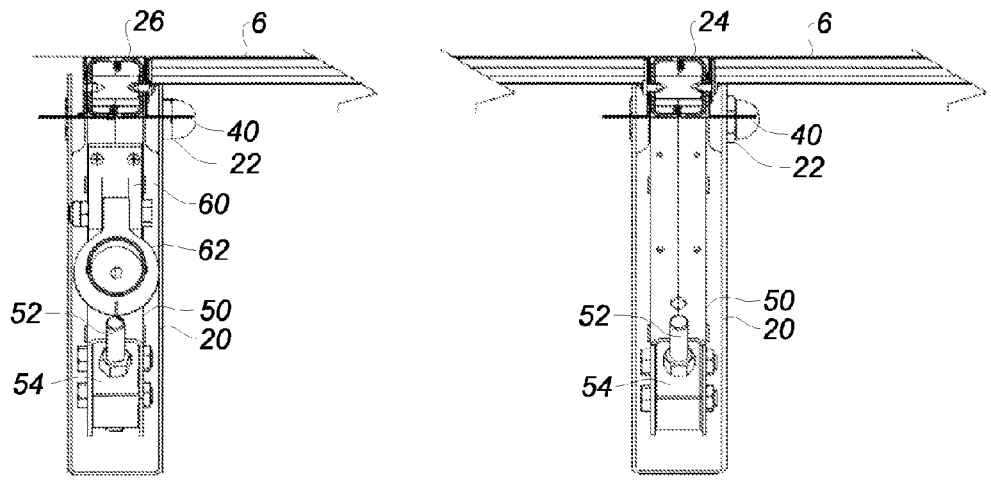
FIG. 6 is a partial longitudinal sectional view of the fixed portion of the sunshade along the sectional plane VI-VI of FIG. 2.
Figure 7:
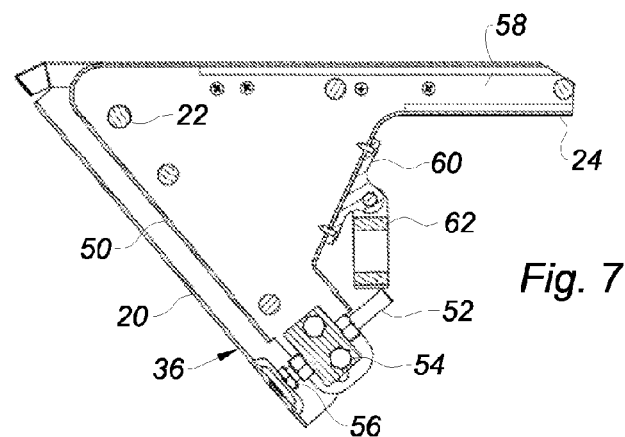
FIG. 7 is a sectional view of the support of a transverse support post including a control cylinder, along the sectional plane IV-IV of FIG. 1.

FIGS. 6 and 7 show a reinforcing box 50 formed in a sheet metal, which makes the linking between each crosspiece 24 and its support 20 fastened to the wall of the building.

The reinforcing box 50 is linked to the support 20 in its upper portion by the screw 22 forming a pivot disposed next to the inner edge, and in its lower portion by a threaded adjustment rod 52 fastened to this support. The threaded rod 52 is engaged in a piercing of a block 54 fastened by two screws to the reinforcing box 50, its axial position is adjusted by a nut disposed on each side of this block, in order to block the position by tightening this block.

It is thus carried out, by adjusting the position of the threaded rod 52 relative to the reinforcing box 50, a pivoting of this box around the screw forming an upper pivot 22, and the crosspiece 24 that it supports. The adjustment angle of this crosspiece 24 relative to the horizontal, is comprised between 30 and 40°.

The adjustment of the inclination of the assembly of the sunshade, comprised between 30 and 40°, allows improving this inclination depending on in particular the latitude of the installation, in order to obtain improved exposure to the sun of the photovoltaic cells 4. Improved protection of the building against solar radiation is obtained at the same time with this adjustment.

The box 50 includes a face facing the outer side of the sunshade, comprising a yoke 60 screwed therein, receiving a tip 62 having a piercing which receives the inner end of the cylinder 28.

Advantageously there are provided basic modules of sunshade including in the length two photovoltaic panels, surrounded each time by a cylinder 28. There is thus a number of cylinders 28 equal to the number of basic modules, plus a cylinder disposed at the final end of the length. The modules are then assembled together to form a variable length sunshade.

The electric cylinders 28 are driven by an electronic control allowing obtaining a synchronized movement of each of these cylinders. It is in particular possible to carry out an automatism which brings out the movable portion 8 when the solar radiation is significant, in order to obtain both better protection of the building against this radiation, as well as a greater power production.

The automation may also carry out a protection against strong winds measured by an anemometer disposed in the vicinity, in particular for speeds of the wind greater than 40 km, by automatically retracting the movable portion 8 when this speed threshold is reached.

Advantageously, the electronic control has an emergency independent power supply in the case of the power supply outage from the network, for example in case of a thunderstorm which may cause high winds, carrying out independently the retraction of the movable portion 8 in order to ensure the safety of the installation.

It will be noted that a sunshade which has twelve photovoltaic panels 4, as shown in FIG. 1, may develop, when the entire surface is deployed, a rated power production output of about 3 kW.

Alternatively the sunshade according to the present disclosure may include other types of movement of the movable portion 8. It may in particular design a movable portion 8 which slides over the fixed portion 2, to be superposed therein in a retracted position. It is also possible to perceive that the cylinder 28 may be incorporated into the crosspieces 24 or the guide rail 26.

Advantageously, it is also possible to install the sunshade according to the present disclosure on private buildings such as houses or residential buildings, on buildings for professional use such as offices or workshops, or on public buildings.

What is claimed is:

1. A sunshade intended to be fastened on a building by an inner side, in order to protect the building from solar radiation, the sunshade comprising:

a fixed portion equipped with crosspieces transversely disposed relative to the inner side;

a first support pivotably attached to the fixed portion;

a movable portion comprising guide members supported by the crosspieces for displacing the movable portion towards the fixed portion to superpose the fixed and movable portions under the action of a motorization system, the fixed and movable portions adapted to receive photovoltaic cells; and an inclination adjusting device disposed between the fixed portion and the first support, wherein each of the guide members includes a rail receiving a set of four rollers fitted in a section of the rail, two rollers of the set being fastened to ends of a second support and bearing on an upper guide, and another two rollers of the set bearing on a lower guide.

2. The sunshade according to claim 1, wherein each crosspiece includes, at an outer end, the second support that receives the rollers fitted in the rail.

3. The sunshade according to claim 2, wherein each second support receives two sets of four rollers.

4. The sunshade according to claim 3, wherein for each second support, one set of the four rollers is positioned on each side of a vertical plane of the second support, the two sets of the four rollers are fitted in two "C" section of the rail such that one set of the two sets is fitted in one of two "C" sections of the rail.

5. The sunshade according to claim 1, wherein the rail is formed by folded sheet metal profiles which are assembled together.

6. The sunshade according to claim 1, wherein the fixed portion is linked to the first support by a pivot, and by a threaded rod which adjusts the rotation of this fixed portion about this pivot.

7. The sunshade according to claim 1, wherein the inclination adjusting device allows an adjustment of a slope of the photovoltaic panels relative to a horizontal position, which is comprised between about 30 and 40°.

8. The sunshade according to claim 1 further comprising a brush for sweeping a surface of photovoltaic cells during movements of the movable portion.

9. The sunshade according to claim 1, wherein the motorization system includes actuators comprising electrical cylinders disposed transversely of the inner side.

10. The sunshade according to claim 1, wherein the motorization system includes a control which automatically displaces the movable portion depending on climatic conditions.

11. The sunshade according to claim 1, wherein the motorization system includes a control having an emergency separate power supply allowing independent retraction of the movable portion.

12. The sunshade according to claim 1 further comprising a plurality of the first supports, wherein each crosspiece is attached to a respective first support among the plurality of the first supports.

13. The sunshade according to claim 1, wherein the inclination adjusting device includes a reinforcing box attached to the first support and the fixed portion, and a threaded rod fastened to the first support, wherein the first support and the fixed portion are attached at a pivot joint, and the threaded rod is operable to pivot the reinforcing box and adjust a position of the fixed portion about the pivot joint.

* * * * *